United States Patent
Ford et al.

(10) Patent No.: US 12,452,149 B2
(45) Date of Patent: Oct. 21, 2025

(54) APPLICATION SPECIFIC NETWORK TELEMETRY AND DIAGNOSTICS

(71) Applicant: Hewlett Packard Enterprise Development LP, Spring, TX (US)

(72) Inventors: Anthony M. Ford, Bristol (GB); Jonathan Paul Beecroft, Bristol (GB); Duncan Roweth, Bristol (GB); Trevor Alan Jones, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 51 days.

(21) Appl. No.: 18/428,792

(22) Filed: Jan. 31, 2024

(65) Prior Publication Data
US 2025/0247313 A1    Jul. 31, 2025

(51) Int. Cl.
*H04L 43/06* (2022.01)

(52) U.S. Cl.
CPC .................... *H04L 43/06* (2013.01)

(58) Field of Classification Search
None
See application file for complete search history.

(56) References Cited

U.S. PATENT DOCUMENTS

| | | | | |
|---|---|---|---|---|
| 11,621,904 | B1* | 4/2023 | Matthews | H04L 43/10 709/241 |
| 2020/0021490 | A1* | 1/2020 | Schrimpsher | H04L 45/64 |
| 2020/0220793 | A1* | 7/2020 | Hira | H04L 43/065 |
| 2023/0164041 | A1* | 5/2023 | Marshall | H04L 41/40 709/224 |
| 2023/0396541 | A1* | 12/2023 | Khan | H04L 69/22 |

OTHER PUBLICATIONS

"Grafana_ The open observability platform _ Grafana Labs", available online at <https://web.archive.org/web/20230405012305/https://grafana.com/>, Apr. 5, 2023, 6 pages.

Bosshart et al., "P4: Programming Protocol-Independent Packet Processors", ACM SIGCOMM Computer Communication Review, vol. 44, No. 3, Jul. 2014, pp. 88-95.

(Continued)

*Primary Examiner* — Mohamed Ibrahim
(74) *Attorney, Agent, or Firm* — Slater Matsil, LLP

(57) ABSTRACT

In certain embodiments, a method includes identifying, by a NIC of a node where application sender of an application executes, a network data unit for telemetry metadata insertion based on performing a match operation on information associated with the network data unit, wherein the network data unit is being transmitted from the application sender to an application receiver executing on another node; inserting, based on a first success of the first match operation, telemetry metadata into the network data unit, the telemetry metadata comprising network information and application specific information; stripping, by a last hop device along the data flow path, the telemetry metadata from the network data unit; generating, by the last hop device, a telemetry metadata report using the telemetry metadata; and providing the telemetry metadata report to an application collector executing on the second node.

20 Claims, 5 Drawing Sheets

(56) References Cited

OTHER PUBLICATIONS

Kibana, "Turn data into results, response and resolution", available online at <https://web.archive.org/web/20230413021408/https://www.elastic.co/kibana/>, Apr. 13, 2023.
Mininet Project Contributors, "Mininet_ An Instant Virtual Network on Your Laptop (or Other PC)—Mininet", available online at <https://mininet.org/>, 2022, 2 pages.
SST, "The Structural Simulation Toolkit", available online at <https://web.archive.org/web/20230408172731/http://sst-simulator.org/>, Feb. 2023, 3 pages.
The P4.org Applications Working Group, "In-band Network Telemetry (INT) Dataplane Specification Version 2.1", Nov. 11, 2020, 56 pages.

* cited by examiner

| Network Data Unit 400 |
| --- |
| MAC Header 406 |
| IP Header 404 |
| Upper Layer Payload 402 |

FIG. 4A

| Network Data Unit 400 |
| --- |
| MAC Header 406 |
| IP Header 404 |
| Initial Telemetry Metadata 408 |
| Additional Telemetry Metadata A 410 |
| Additional Telemetry Metadata B 412 |
| Additional Telemetry Metadata C 414 |
| Additional Telemetry Metadata D 416 |
| Additional Telemetry Metadata E 418 |
| Upper Layer Payload 402 |

FIG. 4B

APPLICATION SPECIFIC NETWORK TELEMETRY AND DIAGNOSTICS

SUPPORT STATEMENT

This invention was made with Government support under Contract Number H98230-15-D-0022/0007 awarded by the Maryland Procurement Office. The Government has certain rights in this invention.

BACKGROUND

Applications often cause data to be sent over a network. Thus, application performance may be related to performance of the network through which the data traverses. However, there is often a disconnect between network telemetry data, and the particular applications that caused the data to be transmitted and/or received, making correlation of application behavior and network operation difficult.

BRIEF DESCRIPTION OF THE DRAWINGS

Certain embodiments discussed herein will be described with reference to the accompanying drawings listed below. However, the accompanying drawings illustrate only certain aspects or implementations of embodiments described herein by way of example, and are not meant to limit the scope of the claims.

FIG. 4A illustrates an example network data unit without telemetry metadata in accordance with one or more embodiments disclosed herein;

FIG. 4B illustrates an example network data unit with telemetry metadata inserted in accordance with one or more embodiments disclosed herein.

DETAILED DESCRIPTION OF ILLUSTRATIVE EMBODIMENTS

Figure 1:
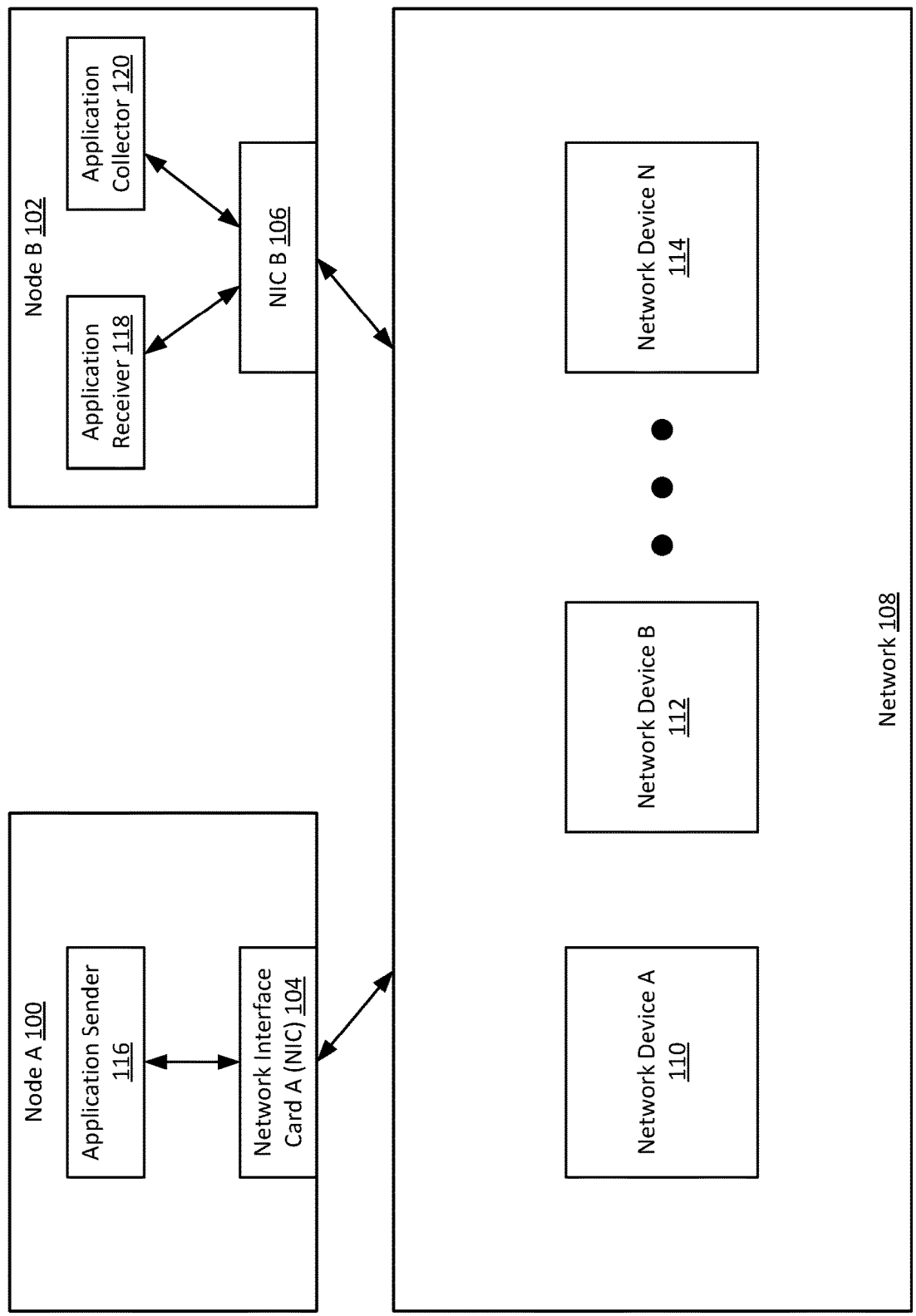
FIG. 1 illustrates a block diagram of an example system for implementing techniques for obtaining application specific telemetry metadata in accordance with one or more embodiments disclosed herein.

Application data is often sent, in the form of network data units (e.g., packets) from one portion of an application (e.g., an application sender) to another part of an application (e.g., an application receiver) for applications executing on two or more nodes (e.g., computing devices). Such applications may include an ever-increasing possible scale (e.g., tens of thousands of nodes). However, it may be challenging to correlate network data units from a particular application with network telemetry information as the network data units traverse a network from the application sender to the application receiver, as application instrumentation is not (and often cannot be) aware of the network devices that the network data unit traverses, and, conversely, network devices are often not aware of what specific applications are sending and/or receiving data.

Network telemetry data (e.g., network devices traversed, ingress and egress ports, ingress and egress timestamps, queue/buffer depths, routing and forwarding decision information, local and/or aggregate latency, etc.) gathered for network data units traversing a network is often sent to a collector device that collects such information for a network. However, correlating such aggregated network telemetry data with specific applications sending and receiving data may be challenging, and require significant overhead of post processing techniques to derive which applications are contributing to which flows of network data. Moreover, aggregation of network telemetry data may suffer from other issues, including, but not limited to: aliasing (where timestamps relate to sampling time rather than actual event time); the fact that sampling further contributes to challenges with correlating network telemetry data with applications, as application information may not correspond to the sampling times used; the fact that security measures must be taken to help ensure that information about a given application is not shared with users of other applications, etc. Additionally, problems such as those discussed above may be exacerbated as the scale of an application grows to larger numbers of nodes, as the centralized collector may be receiving data from large numbers of nodes per application, as well as any number of applications that may be using a large scale network.

Such characteristics may cause difficulty to clearly understand what is actually happening for an application sending and receiving data over shared information data paths (e.g., a series of dynamically selected hops along a data flow path to a destination). In one or more embodiments, the phrase shared data paths refers to paths that data may traverse within a network, which may be used by any number of entities (e.g., applications) that may be sending and/or receiving data via the network, which is what makes the data paths 'shared'. In one or more embodiments, the data path that a given network data unit takes through a network may be dynamically determined (e.g., at each hop), and, thus, may not be the same each time an entity sends a network data unit to the same other entity.

In order to address at least a portion of the aforementioned problems, embodiments disclosed herein provide techniques that allow application specific data flows and network telemetry to be correlated in real time as network data units traverse network device hops in a network path from an application sender (e.g., executing on a first node, or sender node, of an application) to an application receiver (e.g., executing on a second node, or a receiver node, of the application). Telemetry metadata, including information about the application and network telemetry information, may be inserted into network data units between standard packet headers (e.g., between layer 4 (L4) and layer 3 (L3) headers). Such telemetry metadata may be added by any device (e.g., network interface card (NIC), network device (e.g., switch, router, etc.)) along the data flow path for the network data unit as it traverses a network from an application sender to an application receiver.

In one or more embodiments, the telemetry metadata is removed from the network data unit before the network data unit is delivered to the application receiver. In one or more embodiments, the per-hop telemetry metadata that is stripped from the network data unit is provided to an application collector that executes on the same node as the application receiver. Thus, in one or more embodiments, the application collector receives a report that includes a variety of network telemetry information and application information of the application associated with the data flow of which the network data unit is a part. Therefore, network telemetry data may be directly correlated with the application sending and receiving the network data unit without requiring challenging post processing by a central collector to attempt to make such a correlation, and avoids the problem of aliasing seen when sampling of network data units is performed (e.g., as in sFlow telemetry). Additionally, because the telemetry metadata reports are provided to an application collector on the receiving node for the network data unit, the telemetry gathering process is able to scale as the size (e.g., number of nodes) of an application correspondingly scales.

In one or more embodiments, telemetry metadata is added to network data units at each hop of a data flow path (e.g., through a network from an application sender to an application receiver) that includes a device that is configured to perform techniques disclosed herein. As used herein, a hop may be any device or component through which a network data unit traverses along a data flow path from an application sender to an application receiver, such as, for example, NICs (e.g., devices installed in nodes on which an application executes), and network devices (e.g., switched, routers, etc.) of a network. All or any portion of the hops along a data flow path may be configured/enabled to add telemetry metadata to network data units.

The devices of any hop so configured may include match-action rules. In one or more embodiments, the devices perform a match on any one or more portions of any headers or fields of a network data unit, such as, for example, layer 2 (L2), L3, and/or L4 fields, which may include, but are not limited to, source and destination Internet Protocol (IP) addresses, source and destination Media Access Control (MAC) addresses, source and destination port numbers (e.g., Transmission Control Protocol (TCP) and/or Universal Datagram Protocol (UDP) port numbers), virtual local area network (VLAN) tags, virtual network identifiers (VNIs), flow labels, differentiated services code point (DSCP) values, etc.

In one or more embodiments, once a match is identified, the corresponding action is to insert telemetry metadata into the network data unit, which occurs at each hop for which embodiments disclosed herein are enabled. In one or more embodiments, in the first instance of insertion of telemetry metadata, a telemetry header along with the telemetry metadata at that hop, thereby signaling the start of the telemetry metadata within the network data unit. The total size of added telemetry metadata added by a device at a hop may be small (e.g., sixty four bytes), so that the overall performance of the network has little or no impact. Any impact that may occur may be mitigated to some degree by, for example, configuring devices to only add metadata to a certain portion of matched network data units (e.g., one out of every N network data units) instead of all matched network data units, by not adding telemetry metadata to packets below a configured size threshold, etc. In one or more embodiments, devices after the first hop (e.g., the NIC of the node on which the application sender executes) may be able to match on fields in the telemetry metadata added by previous devices.

As an example, a network data unit sent from an application sender may be provided to a NIC of the node on which the application sender executes, so that the NIC may transmit the network data unit into the network (e.g., the network data unit ingresses into the network). The NIC may perform a match using all or any portion of the information received in association with the network data unit to be transmitted. When a match is identified, the NIC may insert telemetry metadata into the network data unit (e.g., between the L4 and L3 headers). The telemetry metadata may include both network information and application information, thereby allowing the network data unit to be associated with a specific application (or any portion thereof). As an example, the application information may include an application identifier (identifying the application as a whole), and may additionally or alternatively include tokens or other application instrumentation indicating application execution phase/stage, application library call markers, etc. Such instrumentation may be added explicitly from the application, implicitly by being added by a linked communication library, and/or by matching on particular communication identifiers.

The information included in the telemetry metadata may be any type of information without departing from the scope of embodiments disclosed herein, which may include telemetry data, as well as telemetry-related state information. Examples include, but are not limited to, device identifiers and related information, ingress and egress interfaces, latency information, ingress and egress timestamps, queue and buffer states, information about transformations performed on the network data unit, forwarding and routing decisions, and/or any optional programmable field information (e.g., function being performed by the application, phase of application execution, more specific application or application portion identifying information, op codes that may be recognized by an application user, free text of any sort, etc.). In one or more embodiments, the telemetry metadata may include additional programmable fields that may be used for any optional scrape of any of a device's configuration state, device counters, error conditions, etc. As an example, any data that is held in one or more registers of devices adding the aforementioned telemetry metadata to a network data unit may be included in the metadata that is gathered. In one or more embodiments, the telemetry metadata may include queue depts, utilization, or loading values, which may include contributions added by unrelated or other application network traffic, which may be the cause of subpar or less than expected performance of the application for which telemetry metadata is being collected. In one or more embodiments, telemetry metadata may include traffic class information. As an example, a best effort class may be affected by dedicated class, and a packet sent in a best effort class, collecting metadata, could be able to see a link is also delivering packets in a dedicated class and this may be the reason for a higher than expected latency.

Continuing the above example, in one or more embodiments, once the network data unit that includes the aforementioned telemetry metadata added by the NIC of the node of the application sender ingresses into the network, each hop of the data flow path through the network that includes a network device configured to perform embodiments disclosed herein may similarly perform a match on any L2, L3, L4, or previously inserted telemetry metadata (e.g., any data in any field in any header of the network data unit). In one or more embodiments, when a network device identifies a match, the network device may perform a corresponding action of inserting its own telemetry metadata into the network data unit, including any network telemetry information (discussed above), as well as any optionally configured information desired to be collected for data flows of the application (e.g., register states of the network device).

In one or more embodiments, any device of a hop along the data flow path may be configured as the last hop at which telemetry metadata is added to the network data unit. As an example, the NIC of the node on which the application receiver executes may be the last hop to add telemetry metadata. As another example, any network device along the data flow path before the network data unit arrives at the node of the application receiver may be the last hop at which telemetry metadata is added.

In one or more embodiments, the device (e.g., NIC of receiving node, network device, etc.) of the last hop at which telemetry metadata is inserted into the network data unit may be further configured to strip the telemetry metadata added at each hop having a device configured to perform techniques disclosed herein from the network data unit. In one or more embodiments, the network data unit, without the telemetry metadata may then be provided to the application receiver. As an example, when the NIC of the node of the application receiver is the final hop, the NIC may strip the telemetry metadata, and pass the network data unit up the network stack to the application receiver. As another example, when the last hop is a network device along the data flow path, the network device may strip the telemetry metadata, and transmit the network data unit towards the node of the application receiver.

In one or more embodiments, the stripped telemetry metadata may be used to generate a report that includes the application information and network information of the telemetry metadata. In one or more embodiments, the report is provided to an application collector executing on the node of the application receiver. The application collector may then store the telemetry metadata from the report (e.g., in memory) to be used for any purpose (e.g., either used directly in real-time as the telemetry metadata arrives at the application receiver, or indirectly during post-mortem analysis of the telemetry metadata from stored data).

As an example, the telemetry metadata may be used to render real-time information about the application performance in a user interface to be viewed by a user of the application. As another example, the telemetry metadata may be stored in a data structure in a persistent storage device (e.g., a database) for later consumption and/or analysis. As another example, the telemetry metadata may be provided to a remote collector configured to receive telemetry metadata specific to the application, which may be further configured to perform analysis on the aggregated telemetry metadata of the application. The application-specific telemetry metadata may be used for any other purpose without departing from the scope of embodiments disclosed herein.

Certain embodiments of this disclosure may provide a capability of associating application-specific information with network telemetry metadata to allow for an application user to gain insight into the performance and/or operation of an application as it uses a network. Such a capability may be provided by configuring NICs and network devices to match information of network data units, and perform actions based on the match, where the actions include appending to the network data units a variety of telemetry metadata, including network telemetry information and any other information relevant to an application. An application collector executing on the same node as the intended application receiver of a network data unit may receive the telemetry metadata inserted into the network data unit at each configured hop, and stripped from the network data unit at the last such hop.

The telemetry metadata may then be stored and/or used to gain information about the performance of the application, as the telemetry metadata includes both the network telemetry information at each hop, as well as application specific information that allows the network telemetry information to be associated with a specific application. The collection of application-specific telemetry metadata may be scalable, as it is collected by application collectors executing at each node of an application instead of a centralized collector that receives network telemetry data for an entire network regardless of the application causing the data flow, and avoids the need for time and resource consuming post processing of network telemetry data by such a collector attempting to correlate data flows with specific applications. Additionally, the telemetry metadata may provide insights that could lead to improved load balancing of a dynamically routed network, and may also help improve tail latencies.

FIG. 1 illustrates a block diagram of an example system for implementing techniques for obtaining application specific telemetry metadata in accordance with one or more embodiments disclosed herein. As shown in FIG. 1, the system may include any number of nodes (e.g., node A 100, node B 102) and a network 108. In one or more embodiments, a node (e.g., node A) may include an application sender 116 and a NIC A 104. In one or more embodiments, a node (e.g., node B) may include an application receiver 118, an application collector 120, and a NIC B 106. In one or more embodiments, the network 108 may include any number of network devices (e.g., network device A 110, network device B 112, network device N 114). Each of these components is described below.

In one or more embodiments, a node (e.g., the node A 100, the node B 102) is a computing device. In one or more embodiments, as used herein, a computing device may be any single computing device, a set of computing devices, a portion of one or more computing devices, or any other physical, virtual, and/or logical grouping of computing resources. In one or more embodiments, a computing device is any device, portion of a device, or any set of devices capable of electronically processing instructions and may include, but is not limited to, any of the following: one or more processors (e.g., components that include circuitry) (not shown), memory (e.g., random access memory (RAM)) (not shown), input and output device(s) (not shown), non-volatile storage hardware (e.g., solid-state drives (SSDs), persistent memory (Pmem) devices, hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), an Internet of Things (IoT) device, an array of nodes of computing resources, a supercomputing device, a data center or any portion thereof, and/or any other type of computing device with the aforementioned requirements.

In one or more embodiments, the nodes (e.g., the node A 100, the node B 102) may be part of a set of any number of nodes that are configured to operate as a high performance computing (HPC) environment. In one or more embodiments, an HPC environment may include any number of nodes, which may be homogeneous or heterogenous in regards to device capabilities, and that provide a platform for executing HPC applications (e.g., Artificial Intelligence (AI), machine learning, deep learning, autonomous driving, product design and manufacturing, weather modeling and forecasting, seismic data analysis, financial risk assessment, fraud detection, computational fluid dynamics, DNA sequencing, contextual search algorithms, traffic management, complex simulations, drug research, virtual reality, augmented reality, etc.). In one or more embodiments, HPC environments often provide a platform for executing application workloads that use large numbers of nodes to perform various portions of the application, and, as such, often transmit data to one another over a network (discussed further below).

In one or more embodiments, any or all the aforementioned examples may be combined to create a system of such devices, or may be partitioned into separate logical devices, which may separately or collectively be referred to as a computing device. Other types of computing devices may be used without departing from the scope of embodiments described herein, such as, for example, the computing device shown in FIG. 5 and described below. The system may include any number and/or type of such computing devices (e.g., nodes) in any arrangement and/or configuration without departing from the scope of embodiments disclosed herein.

In one or more embodiments, the storage and/or memory of a computing device or system of computing devices may be and/or include one or more data repositories for storing any number of data structures storing any amount of data (e.g., information). In one or more embodiments, a data repository is any type of storage unit and/or device (e.g., a file system, database, collection of tables, RAM, hard disk drive, solid state drive, and/or any other storage mechanism or medium) for storing data. Further, the data repository may include multiple different storage units and/or devices. The multiple different storage units and/or devices may or may not be of the same type or located at the same physical location.

In one or more embodiments, any storage and/or memory of a computing device or system of computing devices may be considered, in whole or in part, as non-transitory computer readable mediums storing software and/or firmware.

Such software and/or firmware may include instructions which, when executed by the one or more processors (not shown) and/or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods, processes, etc. of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

The system may include any number of nodes, any number of which may be individually or collectively considered a computing device, as used herein. All or any portion of the computing devices may be the same type or be different types of computing devices.

In one or more embodiments, a node (e.g., the node A 100, the node B 102) includes a NIC (e.g., the NIC A 104, the NIC B 106). In one or more embodiments, a NIC is an input and/or output component configured to provide an interface between a node (e.g., the node A 100, the node B 102) and a network (e.g., the network 108, described below). In one or more embodiments, a NIC (e.g., the NIC A 104, the NIC B 106) is used to receive and/or transmit network data units. A network data unit may include a payload (e.g., data intended for consumption by an entity receiving the network data unit) within any number of headers and/or trailers, which may be fields of information intended to allow receiving entities to perform various actions to propagate the network data unit towards a destination (e.g., another device, an application receiver, etc.). Such fields of information may include, but are not limited to, various items of information related to protocols being used for implementing data transmission (e.g., media access control (MAC), internet protocol (IP), transmission control protocol (TCP), user datagram protocol (UDP), address resolution protocol (ARP), hypertext transfer protocol (HTTP), file transfer protocol (FTP), virtual extensible local area network (VXLAN) protocol, multiprotocol label switching (MPLS) segment routing (SR) protocols, etc.), addresses and/or labels related to such protocols (e.g., IP addresses, MAC addresses, label stacks, etc.), fields related to error identification and/or correction, etc. A NIC (e.g., the NIC A 104, the NIC B 106) may be configured with interfaces of any type for receiving and/or transmitting network data units, such as, for example, wireless interfaces, wired interfaces, etc. Although FIG. 1 shows a node (e.g., the node A 100, the node B 102) as including a single NIC, the computing device may include any number of SmartNICs without departing from the scope of embodiments disclosed herein.

In one or more embodiments, a NIC (e.g., the NIC A 104, the NIC B 106) may be a Smart NIC. In one or more embodiments, a SmartNIC is a NIC that includes additional processing resources relative to a standard NIC. A SmartNIC may include various hardware components, subsystems, etc. configured to perform processing on received network data units to offload at least some of such processing from one or more processors of a computing device. Such hardware components may include, but are not limited to, field programmable gate arrays (FPGAs), systems on a chip (SOCs) digital signal processors (DSPs), etc. Such hardware components may be, or be included in, one or more subsystems (e.g., a RISC-ARM subsystem) of a SmartNIC.

In one or more embodiments, a NIC (e.g., the NIC A 104, the NIC B 106) may be configured to identify a network data unit using a match action rule, and perform an action specified by the rule. In one or more embodiments, the match may be performed using any information included in and/or associated with a network data unit received at the NIC (e.g., from an application sender sending a network data unit, intended for an application receiver receiving a network data unit, etc.). In one or more embodiments, a corresponding action based on such a match may include inserting telemetry metadata into the network data unit, stripping telemetry metadata from a network data unit, etc. Various operations of a NIC performed in accordance with one or more embodiments disclosed herein are discussed further below in the descriptions of FIG. 2, FIG. 3, and FIG. 4. Although FIG. 1 shows a node having a single NIC, a node may include any number of NICs without departing from the scope of embodiments disclosed herein.

In one or more embodiments, a node (e.g., the node A 100) may include an application sender (e.g., the application sender 116). In one or more embodiments, the application sender 116 is any hardware (e.g., circuitry), software, firmware, and/or any combination thereof that is configured, at least in part, to cause data to be transmitted over a network.

As an example, an application may be implemented to execute workloads in an HPC environment that include thousands of nodes, where each node executes a portion of the application. In such a scenario, a portion of the application executing on a given node (e.g., the application sender 116 executing on the node A 100) may be configured to transit data from time to time to another portion of the application executing on another node (e.g., the application receiver 118 executing on the node B 102). Although FIG. 1 shows node A 100 having a single application sender 116, a node may include any number of application senders without departing from the scope of embodiments disclosed herein.

In one or more embodiments, a node (e.g., the node B 102) may include an application receiver (e.g., the application receiver 118). In one or more embodiments, the application receiver 118 is any hardware (e.g., circuitry), software, firmware, and/or any combination thereof that is configured, at least in part, to receive data that has been transmitted over a network (e.g., the network 108). As an example, the application receiver 118 may be a portion of an application executing a workload in a cloud environment, and that receives data from other portions of the application (e.g., the application sender 116) from time to time. Although FIG. 1 shows node B 102 having a single application receiver 118, a node may include any number of application receivers without departing from the scope of embodiments disclosed herein. Additionally, a node may include any number of application senders, and also include any number of application receivers without departing from the scope of embodiments disclosed herein.

In one or more embodiments, a node (e.g., the node B 102) may include an application collector 120. In one or more embodiments, the application collector 120 is any hardware (e.g., circuitry), software, firmware, and/or any combination thereof that is configured, at least in part, to receive telemetry metadata reports from last hop devices along a data flow path of a network data unit. In one or more embodiments, as used herein, a last hop device is the last device (e.g., a NIC, a network device, etc.) along a data flow path that is configured to perform operations in accordance with one or more embodiments disclosed herein. In one or more embodiments, a telemetry metadata report is a collection of information based on telemetry metadata stripped from a network data unit before the network data unit is provided to an application receiver (e.g., the application receiver 118). In one or more embodiments, telemetry metadata includes application specific information and network telemetry information added to a network data unit by one or more devices configured to perform operations in accordance with one or more embodiments disclosed herein. The contents of a telemetry metadata report, and the delivery of such a report to an application collector (e.g., the application collector 120) are discussed further in the descriptions of FIG. 2, FIG. 3, and FIG. 4, below. Although FIG. 1 shows a single node (e.g., the node B 102) as including a single application collector (e.g., the application collector 120), any number of nodes may include any number of application collectors, application receivers, and/or application senders without departing from the scope of embodiments disclosed herein.

In one or more embodiments, each node (e.g., the node A 100, the node B 102) of the system is operatively connected to a network (e.g., the network 108). As an example, a NIC (e.g., the NIC A 104, the NIC B 106) of a node (e.g., the node A 100, the node B 102) may provide an operative connection to the network 108. A network (e.g., the network 108) may refer to an entire network or any portion thereof (e.g., a logical portion of the network devices within a topology of network devices). The network 108 may be and/or include a datacenter network, a wide area network, a local area network, a wireless network, a cellular phone network, an InfiniBand network, and/or any other suitable network that facilitates the exchange of information (e.g., via transmission of network data units) from one part of the network to another. The network 108 may be a combination of any of the aforementioned network types. The network 108 may be located at a single physical location or be distributed at any number of physical sites. In one or more embodiments, a network may be coupled with or overlap with, at least in part, the Internet.

In one or more embodiments, the network includes any number of network devices (discussed below), which may collectively implement any number of protocols (e.g., routing and forwarding protocols) and/or techniques (e.g., load balancing techniques) that contribute to decisions on data flow path that a particular network data unit may traverse to get from one node (e.g., the node A 100) operatively connected to the network 108 to another node (e.g., the node B 102) operatively connected to the network. Such decisions may lead to the network 108 having any number of possible data flow paths that may be traversed between nodes, and the decisions made by network devices at various points in time may contribute to the data flow path being dynamic in nature (e.g., not pre-determined for any given network data unit).

In one or more embodiments, the network 108 may include any number of network devices (e.g., the network device A 110, the network device B 112, the network device N 114). The three dots between the network device B 112 and the network device N 114 are intended to show that the network 108 is not limited to any particular number of network devices, and, as such, may include any number of network devices, which may be a large number of network devices in order to facilitate complex networks that are often implemented in data center environments, HPC environments, etc.

In one or more embodiments, a network device (e.g., 110, 112, 114) is a device that includes and/or is operatively connected to persistent storage (not shown), memory (e.g., random access memory (RAM)) (not shown), one or more processor(s) (e.g., integrated circuits, ASICs, etc.) (not shown), and at least one physical network interface (not shown), which may also be referred to as a port, and which may provide connections (i.e., links) to other devices (e.g., computing devices, other network devices, etc.).

In one or more embodiments, a network device (e.g., 110, 112, 114) also includes any number of additional components (not shown), such as, for example, network chips, FPGAs, application specific integrated circuits (ASICs), indicator lights (not shown), fans (not shown), power supply units, power distribution units, etc. At least a portion of such hardware components may be included as part of one or more line cards of the network device 100. In one or more embodiments, a line card, as used herein, refers to a collection of hardware components (e.g., connected by a printed circuit board) that include one or more physical interface (e.g., network ports) and any number of additional hardware components (e.g., ASICs, FPGAs, TCAMs, processor components, other memory components, etc.) that are used, at least in part, to store forwarding information and process network traffic. Forwarding information (which may include all or any portion of information that may be referred to as the 'FIB') may, for example, be stored (e.g., in various tables) in one or more hardware components of the line cards, such as MAC tables, route table entries, multicast forwarding entries, etc, which is sometimes referred to as being part of a data plane. In one or more embodiments, a network device includes information, such as a routing information base (RIB) that includes information (e.g., obtained from various routing protocols) that may be used to program components of the network device to propagate network data units. Such information is sometimes referred to as being in the control plane. A network device (e.g., 110, 112, 114) may include any other components without departing from the scope of embodiments described herein.

In one or more embodiments, as discussed above, a network device (e.g., 110, 112, 114) includes at least one physical interface (and often two or more such physical interfaces). In one or more embodiments, physical interfaces are any hardware, software, or combination thereof that include functionality to receive and/or transmit network data units (e.g., packets, frames, etc.) or any other information to or from a network device (e.g., 110, 112, 114). Physical interfaces may include any interface technology, such as, for example, optical, electrical, etc. Physical interfaces may be configured to interface with any transmission medium (e.g., optical fiber, copper wire(s), etc.).

In one or more embodiments, physical interfaces include and/or are operatively connected to any number of components used in the processing of network traffic. For example, a given physical interface may include a PHY (not shown), which is circuitry that connects a physical information propagation medium (e.g., a wire) to other components (e.g., the hardware components of a line card), which process the network traffic. In one or more embodiments, physical interfaces include and/or are operatively connected to a transceiver, which provides the connection between the physical information transmission medium and the PHY. A PHY may also include any number of other components, such as, for example a serializer/deserializer (SERDES), and encoder/decoder, etc. A PHY may, in turn, be operatively connected to other any number of other components, such as, for example, a media access control (MAC) sublayer. Such a sublayer, may, in turn, be operatively connected to still other higher layer processing components, all of which form a series of components used in the processing of network traffic being received, transmitted, or otherwise used by a network device (e.g., 110, 112, 114) for any purpose.

In one or more embodiments, a network device (e.g., 110, 112, 114) includes any software (e.g., various daemons, a state database, etc.) configured to perform and/or allow other components to perform various functions of the network device (e.g., to process network traffic). Such software may, for example, execute using one or more processors of a network device, or any other hardware resource of a network device capable of executing software.

Examples of a network device (e.g., 110, 112, 114) include, but are not limited to, a switch, a router, a multilayer switch, a fibre channel device, an InfiniBand® device, etc. A network device is not limited to the aforementioned specific examples.

In one or more embodiments, a network device (e.g., 110, 112, 114) includes functionality to receive network data units (e.g., frames, packets, tunneling protocol frames, etc.) at any of the physical interfaces (e.g., ports) of the network device (e.g., 110, 112, 114), and to process the network data units. In one or more embodiments, processing a network traffic includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples of network traffic processing include, but are not limited to, determining: (i) whether to take a security action (e.g., drop the network traffic data unit); (ii) whether to mirror the network traffic data unit; and/or (iii) how to route/forward the network traffic data unit in order to transmit the network traffic data unit from an interface of the network device.

In one or more embodiments, a network device (e.g., 110, 112, 114) is configured with any number of match-action rules. In one or more embodiments, a match-action rule is a rule that causes a network device (e.g., 110, 112, 114) to perform a match on any information included in a network data unit (e.g., any number of fields in any number of headers, any telemetry metadata previously added to the network data unit by other devices, etc.), and to perform one or more corresponding actions (e.g., adding telemetry metadata) when the match is successful (e.g., one or more fields in the network data unit match information that the network device is configured to include and that is associated with the match action rule). The use of match-action rules in accordance with one or more embodiments disclosed herein is discussed further below in the descriptions of FIG. 2, FIG. 3, and FIG. 4.

While FIG. 1 shows a particular configuration of components, other configurations may be used without departing from the scope of embodiments described herein. For example, although FIG. 1 shows certain components as part of the same device, any of the components may be grouped in sets of one or more components which may exist and execute as part of any number of separate and operatively connected devices. As another example, a single component may be configured to perform all or any portion of the functionality performed by the components shown in FIG. 1. Accordingly, embodiments disclosed herein should not be limited to the configuration of components shown in FIG. 1.

Figure 2:
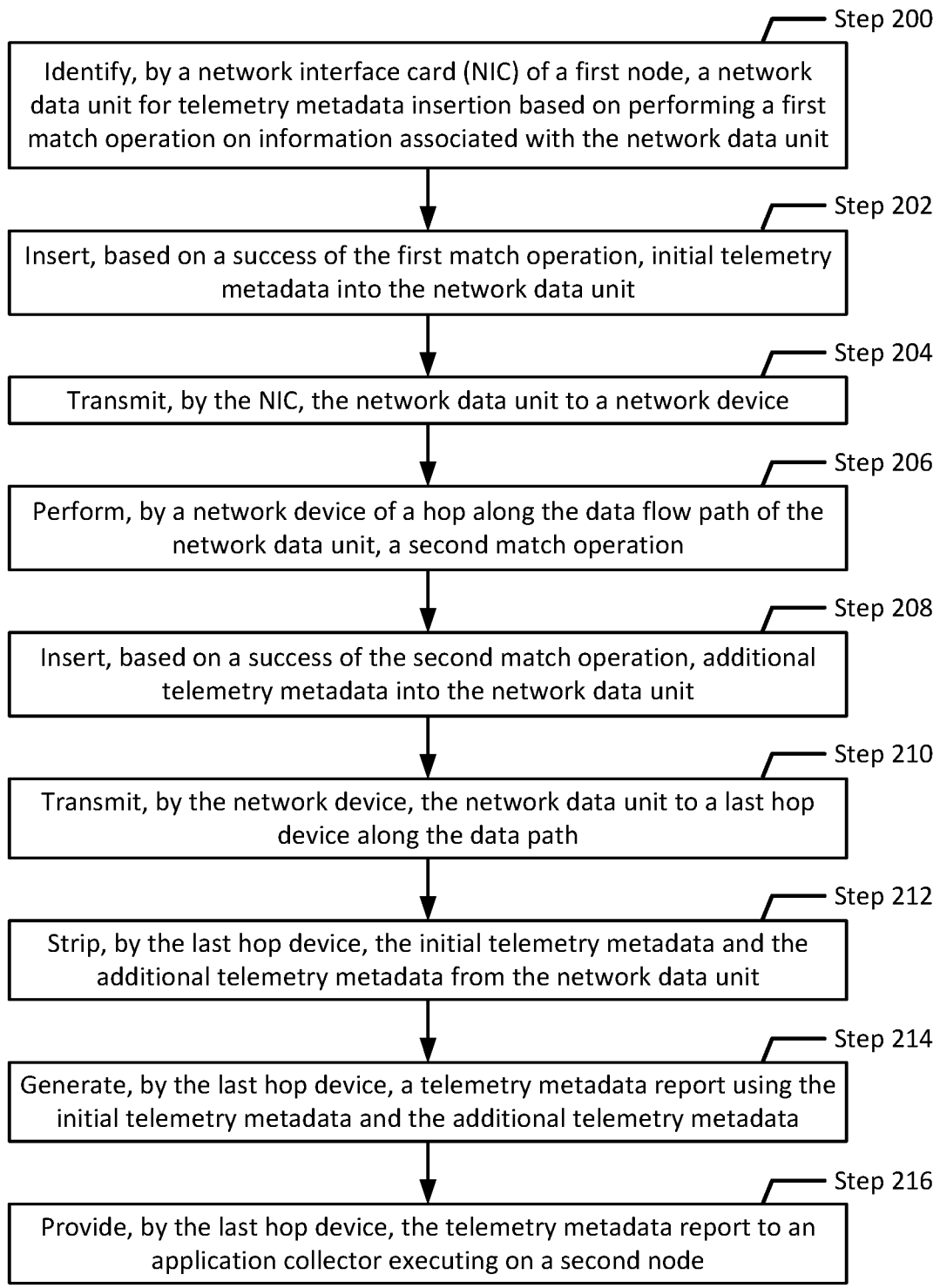
FIG. 2 illustrates an overview of an example method for obtaining application specific telemetry metadata in accordance with one or more embodiments disclosed herein.

FIG. 2 illustrates an overview of an example method for obtaining application specific telemetry metadata in accordance with one or more embodiments disclosed herein. All or any portion of the method shown in FIG. 2 may be performed, for example, by a device or set of devices (e.g., the NIC A 104, the NIC B 106, the network device A 110, the network device B 112, the network device N 114 of FIG. 1) configured to perform operations in accordance with one or more embodiments disclosed herein.

While the various steps in the flowchart shown in FIG. 2 are presented and described sequentially, some or all of the steps may be executed in different orders, some or all of the steps may be combined or omitted, other steps not shown in FIG. 2 may additionally be performed, and/or some or all of the steps may be executed in parallel with other steps of FIG. 2.

In Step 200, the method includes identifying, by a NIC (e.g., the NIC A 104 of FIG. 1) of a first node (e.g., the node A 100 of FIG. 1) on which an application sender (e.g., the application sender 116 of FIG. 1) executes, a network data unit for telemetry metadata insertion. In one or more embodiments, the identification of the network data unit occurs by the NIC executing a match action rule with which the NIC is configured. In one or more embodiments, executing the match action rule includes performing a match operation on any information included in and/or associated with the network data unit. Such information may include, but is not limited to, any one or more portions of any headers or fields of a network data unit, such as, for example, L2, L3, and/or L4 fields, which may include, but are not limited to, source and destination IP addresses, source and destination MAC addresses, source and destination port numbers (e.g., TCP and/or UDP port numbers), VLAN tags, VNIs, flow labels, differentiated services code point (DSCP) values, application identifiers, flow identifiers, flow labels, protocol information, etc. As an example, a network data unit sent from an application sender may be provided to a NIC of the node on which the application sender executes, so that the NIC may transmit the network data unit into the network (e.g., the network data unit ingresses into the network). The NIC may perform a match using all or any portion of the information received in association with the network data unit to be transmitted. In one or more embodiments, in scenarios where the NIC of the node on which the application sender executes is not configured with such match action rules (e.g., to perform operations in accordance with one or more embodiments disclosed herein), the first match operation may alternately be performed by the first device (e.g., a network device) along the data flow path of the network data unit that is so configured.

In Step 202, the method includes inserting, based on a success of the first match operation, initial telemetry metadata into the network data unit. As an example, the initial telemetry metadata may be inserted into the network data unit by the NIC that was provided the network data unit from the application sender. In one or more embodiments, the initial telemetry metadata includes both network information (e.g., network telemetry information and/or any other network information relevant to and/or related to the device inserting the telemetry metadata) and application information (e.g., any information specific to the application of which the application sender is a part). In one or more embodiments, initial telemetry metadata may be considered to include a metadata header indicating the start of the telemetry metadata within the network data unit.

The initial telemetry metadata may include, but is not limited to: information identifying the application; information identifying a portion of the application causing the data to be sent (e.g., process, application phase, application stage, application function, application operation, etc.); device information (e.g., device identifier of the NIC); ingress and/or egress interface for the network data unit; latency information, which may include arrival time of the network data unit at the NIC, time spent processing the network data unit prior to sending; etc.; queue arbitration parameters (e.g., time network data unit spent in buffers); ingress and egress timestamps, which may be high resolution timestamps (e.g., at a nanosecond scale) gained using techniques such as precision time protocol (PTP); header translation information, processing, and/or transformation times; link utilization information; link load and congestion indicators; various queue and buffer states; network data unit pipeline operations; network data unit transformations; virtual routing and forwarding (VRF) information; flow information (e.g., is a network data unit starting a new flow or part of an on-going flow?); changes to the size of the network data unit; information about routing and forwarding decisions made; any other type of data included in optional scrape fields (e.g., state of device registers, statistics, counters, codes that indicate something about the application to a user, free text of any sort, etc.), information about reasons a network data unit may be blocked for a period of time, measurement information of type and/or degree of congestion, and/or any combination thereof. Any other relevant information may be included in the initial telemetry metadata without departing from the scope of embodiments disclosed herein. In one or more embodiments, a portion of the telemetry metadata may be standard telemetry information based on a network monitoring framework (e.g., In-Band Network Telemetry (INT)), and another portion may be information specific to embodiments disclosed herein that is specific to the application sending the network data unit, which may change over time as users of the application fine-tune what information is needed to assess the performance of the application.

In one or more embodiments, inserting the initial telemetry metadata into the network data unit may include inserting the telemetry metadata into a pre-defined specific location within the network data unit. As an example, the NIC may insert the initial telemetry metadata between a first portion of the headers of the network data unit (e.g., headers related to the application, presentation, session, and/or transport layers), and other headers used to allow the network data unit to traverse network devices (e.g., the network, data link, and physical layers). For example, the initial telemetry metadata may be inserted into the network data unit below the Ethernet header (e.g., including MAC address information) and the IP header (e.g., including IP address information), and above the remainder of the network data unit (e.g., the L4 payload). The initial telemetry metadata may be inserted into any other location in the network data unit without departing from the scope of embodiments disclosed herein.

In one or more embodiments, the inclusion of both application specific information and network information in the initial telemetry metadata allows the collection of telemetry metadata for the network data unit to be associated with the specific application causing the sending of the network data unit without the need for extensive post processing of the network data unit by a collector of such information that is not specific to the application, and may allow devices along the data flow path to identify network data units as being related to a particular application, and/or portion thereof, in order to tailor the telemetry metadata added to the network data unit for the particular application.

In one or more embodiments, a match action rule (e.g., configured on the NIC of the node executing the application sender or any other device on the data flow path) may include that all or any portion of network data units for which a match operation is successful have telemetry metadata inserted. As an example, in some scenarios, it may be important to insert telemetry metadata into each such network data unit to gain insight into the performance of an application as the application sends data over a network. As another example, a match action rule may specify that only some network data units are to have telemetry metadata inserted (e.g., in order to not adversely impact network data unit transmission performance), such as only inserting network telemetry metadata into a portion of the matched network data units (e.g., one of every ten), or not inserting telemetry metadata into network data units below a threshold size (e.g., so that the size of the network data unit is not substantially increased by the insertion). In one or more embodiments, a match action rule may specify that telemetry metadata is only inserted for certain traffic classes (which may be indicated by one or more fields in a network data unit).

In Step 204, the method includes transmitting, by the NIC, the network data unit to a network device (e.g., one of the network devices 110, 112, or 114 of FIG. 1). In one or more embodiments, transmitting the network data unit includes preparing the network data unit for transmission (e.g., performing any transformations of the network data unit, such as adding and/or modifying header information identifying the next hop), and sending the network data unit as a series of bits transmitted over a transmission medium.

In Step 206, the method includes performing, by a network device along the data flow path of the network data unit, a match operation using any information included in the network data unit. In one or more embodiments, the network device, similar to the above-described NIC, may be configured with one or more match action rules, and may perform a match operation pursuant to such a rule to determine if a network data unit successfully matches information against which the network device is configured to perform a comparison. The network device executing such a match action rule may be the first network device on the data flow path configured to perform operations in accordance with embodiments disclosed herein, which may be the first network device the network data unit reaches after leaving the node of the application sender, or may be any subsequent device along the data flow path. In one or more embodiments, the execution of the match action rule may be similar to that discussed above with regards to the NIC of the node of the application sender. As such, in one or more embodiments, the network device may match on any information in any field of any header of the network data unit, as well as on any telemetry metadata previously added to the network data unit in accordance with embodiments disclosed herein, or any combination of such information.

In Step 208, the method includes inserting, based on a successful match operation performed in Step 206, additional telemetry metadata into the network data unit. In one or more embodiments, the additional telemetry metadata may include all or any portion of the types of information inserted as initial telemetry metadata (discussed above), but specific to the network device performing the insertion of the additional telemetry metadata. As an example, the additional telemetry metadata may include any of the standard in-band network telemetry data (e.g., ingress/egress interface, latency information, routing and forwarding decision information, buffer and queue depths, etc.), as well as any optional information (e.g., device register states, counter information, etc.) that is particular to the network device as it receives, processes and/or transmits the network data unit. In one or more embodiments, the set of information included in the additional telemetry metadata is configured via the match action rule implemented on the network device.

In one or more embodiments, the additional telemetry metadata is inserted into the network data unit in a location similar to that of the initial telemetry metadata and/or any other telemetry metadata added by other network devices before the network data unit reaches the network device. As an example, the network device may insert the additional telemetry metadata after the initial telemetry metadata in the network data unit, where "after" refers to the location of the telemetry metadata within the stack of telemetry metadata built as each hop adds its telemetry metadata to the network data unit.

In one or more embodiments, any number of network devices may exist along the data flow path for a network data unit, and each device configured in accordance with embodiments disclosed herein with match action rules that cause telemetry metadata to be added based on a successful match may similarly insert additional telemetry metadata related to the network device inserting the telemetry metadata, which may lead to a per-device stack of telemetry metadata within the network data unit. As an example, a first device, such as a NIC on a node where an application sender executes, may insert the initial telemetry data into a particular location in the network data unit (e.g., between L3 and L4 headers), starting with a telemetry header and the telemetry metadata that are part of the initial telemetry metadata. The telemetry header in the initial telemetry metadata may signal the start of the telemetry metadata for the network data unit. At each subsequent hop where telemetry metadata is added, the additional telemetry metadata may be appended to the previous telemetry metadata added by one or more previous hops. Thus, each unit of telemetry metadata added by a hop along the data path may be a discrete unit of telemetry metadata that is added to the network data unit, in order, after the telemetry header added by the first device as part of the initial telemetry data.

In Step 210, the method includes transmitting, by the network device, the network data unit (which includes the initial telemetry metadata and additional telemetry metadata added by any number of other network devices) towards a last hop device along the data flow path of the network data unit. In one or more embodiments, any device of a hop along the data flow path of the network data unit may be configured as the last hop at which telemetry metadata is added to the network data unit. As an example, the NIC of the node on which the application receiver executes may be the last hop to add telemetry metadata. As another example, any network device along the data flow path before the network data unit arrives at the node of the application receiver may be the last hop at which telemetry metadata is added. In one or more embodiments, although not shown in FIG. 2, the last hop device also adds additional telemetry metadata to the network data unit, similar to the insertion of additional telemetry metadata discussed above in the description of Step 208 (e.g., performing a match operation, and, based on a successful match, performing the action of inserting additional telemetry metadata particular to the last hop device).

In Step 212, the method includes stripping, by the last hop device, the initial telemetry metadata and all additional telemetry metadata from the network data unit. In one or more embodiments, although not shown in FIG. 2, the network data unit, without the stripped telemetry metadata, may be provided to the application receiver for which the network data unit is intended. As an example, when the NIC of the node of the application receiver is the final hop, the NIC may strip the telemetry metadata, and pass the network data unit up the network stack to the application receiver. As another example, when the last hop is a network device along the data flow path, the network device may strip the telemetry metadata, and transmit the network data unit towards the node of the application receiver.

In Step 214, the method includes generating, by the last hop device, a telemetry metadata report that includes the initial telemetry metadata and all additional telemetry metadata. The telemetry metadata report may be in any suitable form (e.g., raw data, formatted in a particular way, etc.). As such, the telemetry metadata report includes, but is not limited to, application specific information (e.g., information identifying the application, or any portion thereof, sending the network data unit), as well as network telemetry information from each hop along the data flow path that added telemetry metadata to the network data unit. A large variety of examples of the types of information that may be included in the telemetry metadata report (e.g., the initial telemetry metadata and the additional telemetry metadata) may be found, for example, in the descriptions of Step 202 and Step 208, above.

In Step 216, the method includes providing, by the last hop device, the telemetry metadata report to an application collector (e.g., the application collector 120 of FIG. 1) executing on the same node (e.g., the node B 102 of FIG. 1)

where the application receiver (e.g., the application receiver 118 of FIG. 1) for which the network data unit was intended executes. The application collector may then store the telemetry meta data from the report (e.g., in memory) to be used for any purpose. As an example, the telemetry metadata may be used to render real-time information about the application performance in a user interface to be viewed by a user of the application. As another example, the telemetry metadata may be stored in a data structure in a persistent storage device (e.g., a database) for later consumption and/or analysis. As another example, the telemetry metadata may be provided to a remote collector configured to receive telemetry metadata specific to the application, which may be further configured to perform analysis on the aggregated telemetry metadata of the application. The application-specific telemetry metadata may be used for any other purpose without departing from the scope of embodiments disclosed herein. In one or more embodiments, as discussed both above and below, providing the telemetry metadata report to the application collector executing on the node where the application receiver executes instead of to a centralized collector may allow the collection of telemetry metadata associated with a specific application be scalable, as it is collected by application collectors executing at each node of an application instead of a centralized collector that receives network telemetry data for an entire network regardless of the application causing the data flow, and avoids the need for time and resource consuming post processing of network telemetry data by such a collector attempting to correlate data flows with specific applications.

Figure 3:
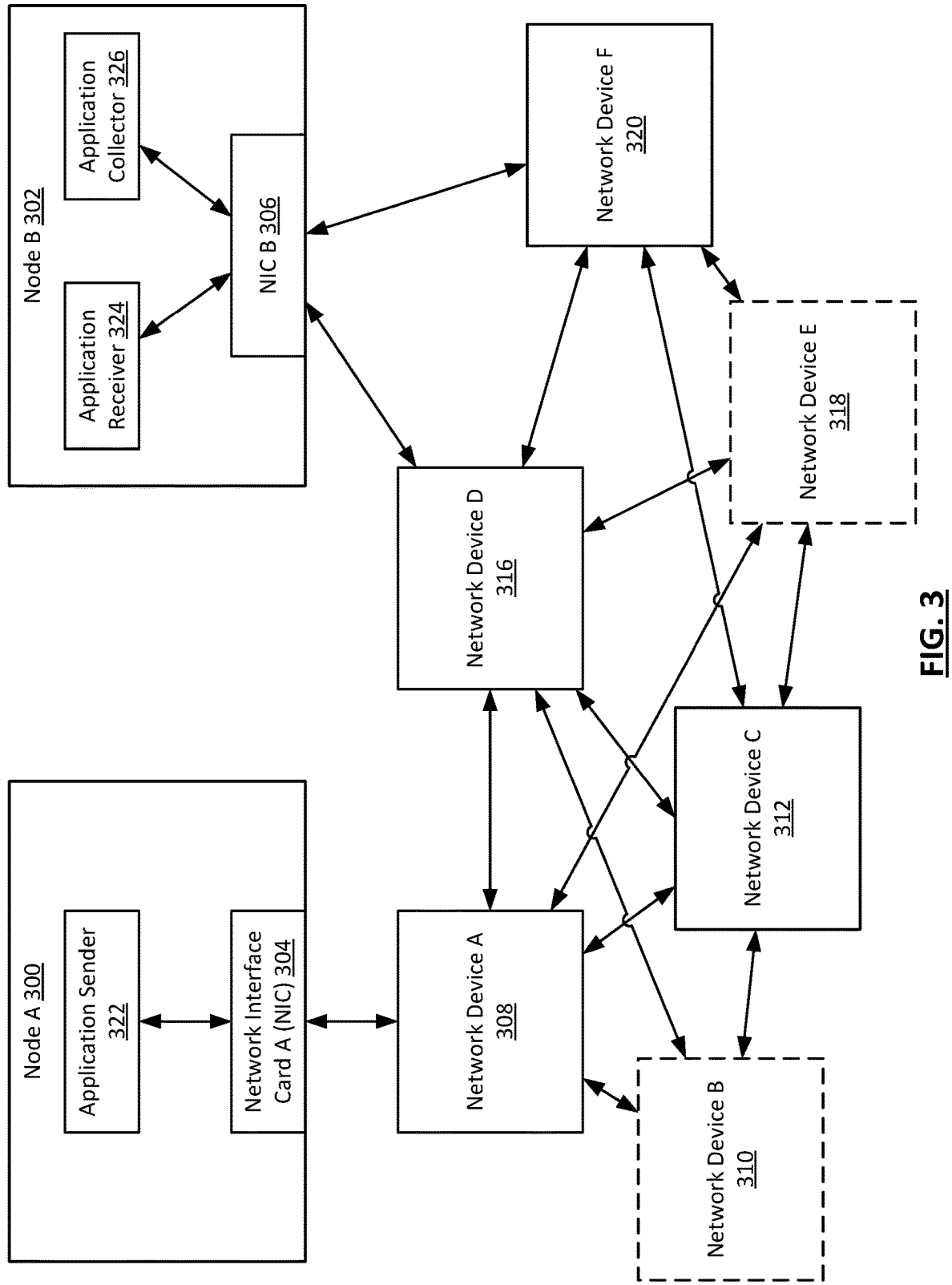
FIG. 3 illustrates an example system for obtaining application specific telemetry metadata in accordance with one or more embodiments disclosed herein.

FIG. 3 illustrates an example system for obtaining application specific telemetry metadata in accordance with one or more embodiments disclosed herein. FIG. 4A illustrates an example network data unit without telemetry metadata in accordance with one or more embodiments disclosed herein. FIG. 4B illustrates an example network data unit with telemetry metadata inserted in accordance with one or more embodiments disclosed herein. The example shown in FIG. 3 and discussed below is a simplified example intended for explanatory purposes only, and not intended to limit the scope of embodiments described herein. Additionally, while the example shows certain aspects of embodiments described herein, all possible aspects of such embodiments may not be illustrated in this particular example.

Consider a scenario in which an HPC application executes on a thousand nodes, two of which are node A 300 and node B 302. An application sender 322 executing on node A 300 is configured to transmit network data units to an application receiver 324 executing on node B 302. A user of the HPC application has noticed that, from time to time, the performance of the application is less than expected, and suspects that the problem may relate to network data units being sent from application senders of the application to application receivers of the application. Therefore, the user, according to embodiments disclosed herein, configures the NIC 304 of the node A 300, the NIC B 306 of the node B 302, and each network device (e.g., 308, 310, 312, 316, 318, and 320) of the network between the two nodes with a variety of match action rules that allow data flows through the NICs and network devices to be associated with the application, and various portions thereof (e.g., different phases of the application, different application functions, etc.).

In such a scenario, the application sender 322 may generate a network data unit, which may include, for example, a data payload, information from various upper layer protocols (e.g., transport layer), destination IP address of node B 302 where the application receiver 324 executes, etc. The network data unit may be provided to the NIC A 304. Without embodiments disclosed herein, the NIC may add additional headers (e.g., an IP header, a MAC header), for transmitting the network data unit towards the application receiver. An example of a network data unit prepared in such a way may be seen in FIG. 4A, where network data unit 400 includes an upper layer payload 402 (including the data payload and any upper layer headers), an IP header 404, and a MAC header 406.

However, in this scenario, the NIC A 304 is configured with a match action rule related to the application of the application sender 322. Therefore, the NIC A 304 performs a match operation that identifies that the network data unit is from the application sender 322, executing a particular phase of the application, to send a particular class of network data unit to a particular TCP port (e.g., at least four fields of the network data unit are matched). Based on the successful match of this information, the NIC A 304 identifies that initial telemetry metadata should be inserted into the network data unit. Therefore, the NIC A 304 inserts the initial telemetry metadata between the upper layer payload 402 and the IP header 404 of the network data unit 400, and transmits the network data unit to the network device A 308.

The network device A 308 is also configured with a match action rule for the application, and similarly performs a successful match operation, and inserts additional telemetry metadata A into the network data unit, and, based on routing and forwarding configuration of the network device A 308, forwards the network data unit to the next hop along the data path, the network device C 312, which also performs a successful match operation, and inserts additional telemetry metadata B into the network data unit. A similar process happens along the data flow path through network device D 316 (which inserts additional telemetry metadata C into the network data unit) and network device F 320 (which inserts additional telemetry metadata D into the network data unit).

Next, the network data unit is transmitted to the NIC B 306 of the node B 302, where the application receiver 324 executes. The NIC B is the last hop along the data flow path, and also executes a match action rule to perform a match operation, and insert additional telemetry metadata into the network data unit. The resulting network data unit 400 with the initial telemetry metadata and the various additional telemetry metadata may be seen in FIG. 4B. As shown in FIG. 4B, at this point, the network data unit 400 includes, between the upper layer payload, the initial telemetry metadata 408 added by the NIC A 304, the additional telemetry metadata A 410 added by the network device A 308, the additional telemetry metadata B 412 added by the network device C 312, the additional telemetry metadata C 414 added by the network device D 316, and the additional telemetry metadata E 418 added by the NIC B 306.

As the last hop device, the NIC B 306 strips the initial telemetry metadata 408, and all of the additional telemetry metadata (410, 412, 414, 416, and 418) from the network data unit, resulting in the network data unit 400 shown in FIG. 4A. The network data unit 400 of FIG. 4A may then be normally processed to provide the network data unit 400 to the application receiver 324 of the node B 302.

The NIC B, as the last hop device, is further configured to generate a telemetry metadata report using the initial telemetry metadata and all of the additional telemetry metadata, and provide the telemetry metadata report to the application collector 326, which is also executing on the node B 302. Thus, the network information (e.g., network telemetry data) from each hop along the data flow path, as well as application specific information, are provided to the application collector 326, which may store or use the information for any purpose, such as allowing a user of the application to assess possible causes of less-than-expected application performance that may arise from issues seen by the network data unit while traversing the data flow path through the network. Such information is already correlated with the application, as the telemetry metadata includes both the network information and the application specific information. Moreover, the telemetry metadata for such network data units sent from the application sender to the application receiver are collated at the application collector, allowing such analysis to scale with the size (e.g., number of nodes) of the application, avoiding the bottlenecks and post processing issues that arise when network telemetry data not specifically associated with an application are sent in the aggregate to a remote collector configured to receive all such data for a network.

Figure 5:
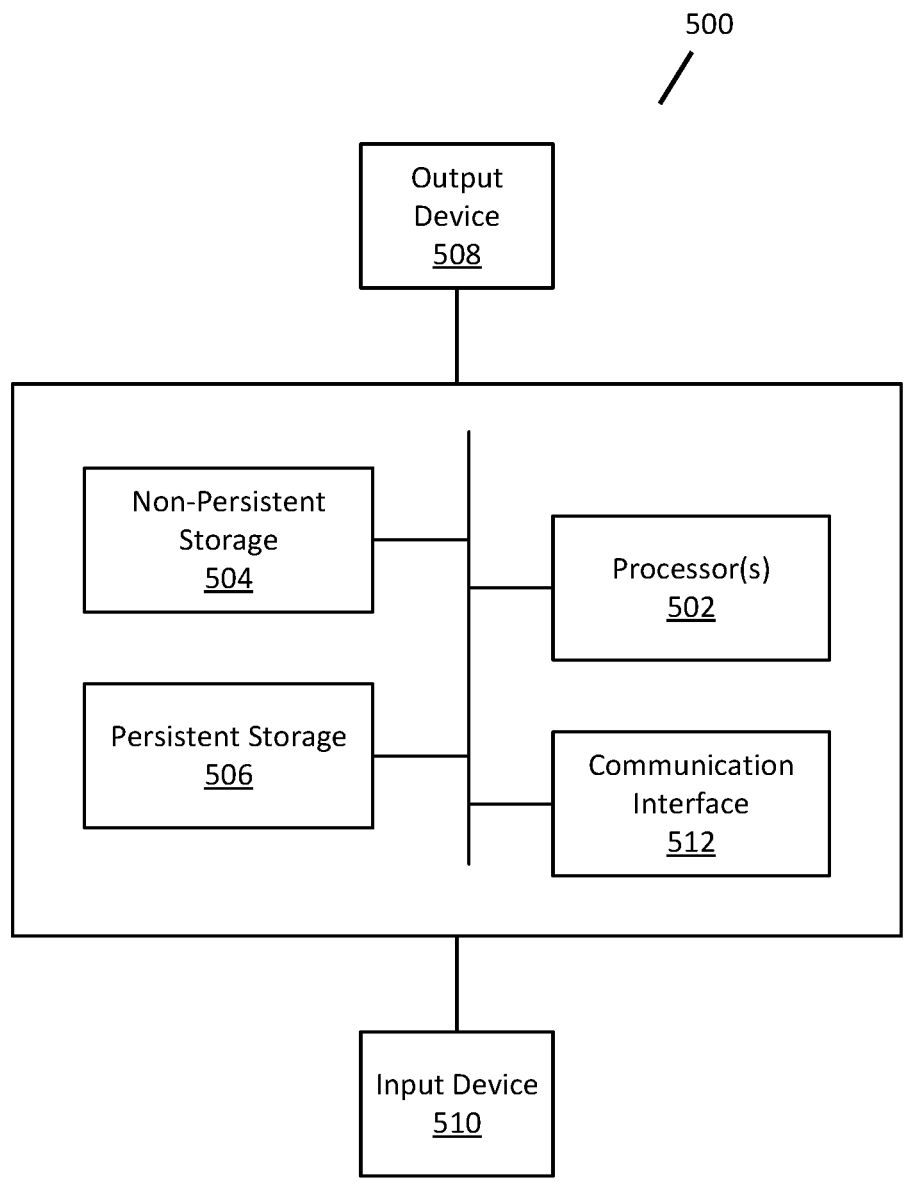
FIG. 5 illustrates a block diagram of a computing device, in accordance with one or more embodiments of this disclosure.

FIG. 5 illustrates a block diagram of a computing device, in accordance with one or more embodiments of this disclosure. As discussed above, embodiments described herein may be implemented using computing devices. For example, the all or any portion of the components shown in FIG. 1 may be implemented, at least in part, using one or more computing devices, and all or any portion of the method shown in FIG. 2 may be performed using one or more computing devices, such as the computing device 500. The computing device 500 may include one or more computer processors 502, non-persistent storage 504 (e.g., volatile memory, such as random access memory (RAM), cache memory, etc.), persistent storage 506 (e.g., a hard disk, an optical drive such as a compact disk (CD) drive or digital versatile disk (DVD) drive, a flash memory, etc.), a communication interface 512 (e.g., Bluetooth interface, infrared interface, network interface, optical interface, etc.), input devices 510, output devices 508, and numerous other elements (not shown) and functionalities. Each of these components is described below.

In one or more embodiments, the computer processor(s) 502 may be an integrated circuit for processing instructions. For example, the computer processor(s) may be one or more cores or micro-cores of a processor. The processor 502 may be a general-purpose processor configured to execute program code included in software executing on the computing device 500. The processor 502 may be a special purpose processor where certain instructions are incorporated into the processor design. The processor 502 may be an application specific integrated circuit (ASIC), a graphics processing unit (GPU), a data processing unit (DPU), a tensor processing units (TPU), an associative processing unit (APU), a vision processing units (VPU), a quantum processing units (QPU), and/or various other processing units that use special purpose hardware (e.g., field programmable gate arrays (FPGAs), System-on-a-Chips (SOCs), digital signal processors (DSPs), etc.), etc. Although only one processor 502 is shown in FIG. 5, the computing device 500 may include any number of processors without departing from the scope of embodiments disclosed herein.

The computing device 500 may also include one or more input devices 510, such as a touchscreen, keyboard, mouse, microphone, touchpad, electronic pen, motion sensor, or any other type of input device. The input devices 510 may allow a user to interact with the computing device 500. In one or more embodiments, the computing device 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing devices exist, and the aforementioned input and output device(s) may take other forms. In some instances, multimodal systems can allow a user to provide multiple types of input/output to communicate with the computing device 500.

Further, the communication interface 512 may facilitate connecting the computing device 500 to a network (not shown) (e.g., a local area network (LAN), a wide area network (WAN) such as the Internet, mobile network, or any other type of network) and/or to another device, such as another computing device. The communication interface 512 may perform or facilitate receipt and/or transmission of wired or wireless communications using wired and/or wireless transceivers of any type and/or technology. Examples include, but are not limited to, those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 512 may also include one or more Global Navigation Satellite System (GNSS) receivers or transceivers that are used to determine a location of the computing device 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of the computing device 500 may be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples of embodiments described herein. It will be understood by those skilled in the art (who also have the benefit of this disclosure) that one or more embodiments described herein may be practiced without these specific details, and that numerous variations or modifications may be possible without departing from the scope of the embodiments described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects of embodiments disclosed herein.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various embodiments described herein, may be equivalent to one or more same or similarly named and/or numbered components described with regard to any other figure. For brevity, descriptions of these components may not be repeated with regard to each figure. Thus, each and every embodiment of the components of each figure is incorporated by reference and assumed to be optionally present within every other figure having one or more same or similarly named and/or numbered components. Additionally, in accordance with various embodiments described herein, any description of the components of a figure is to be interpreted as an optional embodiment, which may be implemented in addition to, in conjunction with, or in place of the embodiments described with regard to a corresponding one or more same or similarly named and/or numbered component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments discussed herein have been described with respect to a limited number of embodiments, those skilled in the art, having the benefit of this disclosure, will appreciate that other embodiments can be devised which do not depart from the scope of embodiments as disclosed herein. Accordingly, the scope of embodiments described herein should be limited only by the attached claims.

What is claimed is:

1. A computer-implemented method, comprising:
 identifying, by a network interface card (NIC) of a first node on which an application sender of an application executes, a network data unit for telemetry metadata insertion based on performing a first match operation on information associated with the network data unit, wherein the network data unit is being transmitted from the application sender of the first node to an application receiver of the application executing on a second node;

inserting, by the NIC and based on a first success of the first match operation, initial telemetry metadata into the network data unit, the initial telemetry metadata comprising network information and application specific information corresponding to the application, wherein the application specific information identifies the application;

performing, by a network device of a hop along a data flow path of the network data unit, a second match operation using at least one of the information associated with the network data unit and the initial telemetry metadata;

inserting, by the network device and based on a second success of the second match operation, additional telemetry metadata into the network data unit;

stripping, by a last hop device of a last hop along the data flow path, the initial telemetry metadata and the additional telemetry metadata from the network data unit to obtain a stripped network data unit;

generating, by the last hop device, a telemetry metadata report using the initial telemetry metadata and the additional telemetry metadata stripped from the network data unit; and providing the telemetry metadata report to an application collector executing on the second node.

2. The computer-implemented method of claim 1, wherein the last hop device comprises a second NIC of the second node.

3. The computer-implemented method of claim 1, wherein the last hop device comprises a second network device along the data flow path.

4. The computer-implemented method of claim 1, wherein the application specific information further identifies a portion of the application.

5. The computer-implemented method of claim 1, further comprising:

transmitting, by the last hop device, the stripped network data unit towards the application receiver along the data flow path.

6. The computer-implemented method of claim 1, wherein:

identifying the network data unit is performed as part of executing a match action rule, and the match action rule specifies that only a portion of network data units having a successful first match operation have respective initial telemetry metadata inserted.

7. The computer-implemented method of claim 1, wherein:

identifying the network data unit is performed as part of executing a match action rule, and the match action rule specifies that any network data unit below a size threshold does not have the initial telemetry metadata inserted.

8. A non-transitory computer-readable medium storing programming for execution by one or more processors, the programming comprising instructions to:

identify, by a network interface card (NIC) of a first node on which an application sender of an application executes, a network data unit for telemetry metadata insertion based on performing a first match operation on information associated with the network data unit, wherein the network data unit is being transmitted from the application sender of the first node to an application receiver of the application executing on a second node;

insert, by the NIC and based on a first success of the first match operation, initial telemetry metadata into the network data unit, the initial telemetry metadata comprising network information and application specific information corresponding to the application, wherein the application specific information identifies the application;

strip, by a last hop device of a last hop along a data flow path of the network data unit, the initial telemetry metadata from the network data unit to obtain a stripped network data unit;

generate, by the last hop device, a telemetry metadata report using the initial telemetry metadata stripped from the network data unit; and provide the telemetry metadata report to an application collector executing on the second node.

9. The non-transitory computer-readable medium of claim 8, wherein the last hop device comprises a second NIC of the second node.

10. The non-transitory computer-readable medium of claim 8, wherein the last hop device comprises a second network device along the data flow path.

11. The non-transitory computer-readable medium of claim 8, wherein:

the programming comprises further instructions to:

perform, by a network device of a hop along the data flow path of the network data unit, a second match operation using at least one of the information associated with the network data unit and the initial telemetry metadata; and insert, by the network device and based on a second success of the second match operation, additional telemetry metadata into the network data unit, the last hop device further strips the additional telemetry metadata from the network data unit, and the additional telemetry metadata is also used to generate the telemetry metadata report.

12. The non-transitory computer-readable medium of claim 8, wherein the application specific information further identifies a portion of the application.

13. The non-transitory computer-readable medium of claim 8, further comprising:

transmitting, by the last hop device, the stripped network data unit towards the application receiver along the data flow path.

14. The non-transitory computer-readable medium of claim 8, wherein:

identifying the network data unit is performed as part of executing a match action rule, and the match action rule specifies that only a portion of network data units having a successful first match operation have respective initial telemetry metadata inserted.

15. The non-transitory computer-readable medium of claim 8, wherein:

identifying the network data unit is performed as part of executing a match action rule, and the match action rule specifies that any network data unit below a size threshold does not have the initial telemetry metadata inserted.

16. A network device, comprising:

one or more processors; and one or more non-transitory computer readable media storing instructions which, when executed by the one or more processors, cause the one or more processors to:

receive a network data unit comprising initial telemetry metadata inserted into the network data unit by a network interface card (NIC) of a first node on which an application sender of an application executes, wherein:
- the initial telemetry metadata comprises network information and application specific information corresponding to the application,
- the application specific information identifies the application,
- the network device is a device along a data flow path of the network data unit, and
- the network data unit is intended for an application receiver executing on a second node;

perform a match operation using at least one of information associated with the network data unit and the initial telemetry metadata;

insert, based on a second success of the match operation, additional telemetry metadata into the network data unit; and transmit the network data unit towards a last hop device along the data flow path of the network data unit.

17. A system, comprising:
the network device of claim 16;
the NIC of the first node; and
the last hop device,
wherein the last hop device is configured to:
- strip the initial telemetry metadata and the additional telemetry metadata from the network data unit to obtain a stripped network data unit;
- generate a telemetry metadata report using the initial telemetry metadata and the additional telemetry metadata stripped from the network data unit; and
- provide the telemetry metadata report to an application collector executing on the second node.

18. The system of claim 17, wherein the last hop device is one of a second NIC on the second node or a second network device along the data flow path.

19. The system of claim 17, wherein the last hop device is further configured to:
transmit the stripped network data unit towards the application receiver along the data flow path.

20. The network device of claim 16, wherein the application specific information further identifies a portion of the application.

* * * * *